US012326297B2

(12) United States Patent
Yu

(10) Patent No.: US 12,326,297 B2
(45) Date of Patent: Jun. 10, 2025

(54) VACUUM DRYING TANK

(71) Applicant: QINGDAO JIAHE YONGRUN BEAUTY TECHNOLOGY CO., LTD., Shandong (CN)

(72) Inventor: Chao Yu, Shandong (CN)

(73) Assignee: QINGDAO JIAHE YONGRUN BEAUTY TECHNOLOGY CO., LTD., Qingdao (CN)

( * ) Notice: Subject to any disclaimer, the term of this patent is extended or adjusted under 35 U.S.C. 154(b) by 616 days.

(21) Appl. No.: 17/729,003

(22) Filed: Apr. 26, 2022

(65) Prior Publication Data

US 2023/0341183 A1 Oct. 26, 2023

(51) Int. Cl.

| | |
|---|---|
| ***F26B 5/04*** | (2006.01) |
| ***F26B 9/00*** | (2006.01) |
| ***F26B 25/00*** | (2006.01) |
| ***F26B 25/06*** | (2006.01) |

(52) U.S. Cl.

CPC .............. *F26B 5/042* (2013.01); *F26B 9/003* (2013.01); *F26B 25/008* (2013.01); *F26B 25/063* (2013.01)

(58) Field of Classification Search

CPC ........ F26B 5/042; F26B 9/003; F26B 25/008; F26B 25/063

USPC .............................................................. 34/92

See application file for complete search history.

(56) References Cited

U.S. PATENT DOCUMENTS

| | | | | |
|---|---|---|---|---|
| 3,795,986 | A * | 3/1974 | Sutherland | F26B 5/06 34/92 |
| 4,662,288 | A * | 5/1987 | Hastings | H05K 7/20 428/920 |
| 5,263,264 | A * | 11/1993 | Usui | F26B 5/04 34/92 |
| 5,743,023 | A * | 4/1998 | Fay | F25D 31/005 34/570 |
| 6,158,833 | A * | 12/2000 | Engler | H05K 5/0209 312/409 |
| 9,347,707 | B2 * | 5/2016 | Struschka | F26B 25/16 |
| 11,359,860 | B2 * | 6/2022 | McNeil | C11B 1/10 |
| 11,359,861 | B2 * | 6/2022 | Ganguly | F26B 25/22 |
| 12,199,259 | B1 * | 1/2025 | Cao | H01M 50/383 |
| 2009/0246823 | A1 * | 10/2009 | Cerbini | A62B 27/00 435/39 |
| 2011/0146100 | A1 * | 6/2011 | Henzman | A23B 9/08 34/406 |

(Continued)

FOREIGN PATENT DOCUMENTS

| | | | | |
|---|---|---|---|---|
| EP | 2589303 | A1 * | 5/2013 | A23B 4/03 |
| IT | PS20060008 | A1 * | 12/2007 | |

(Continued)

*Primary Examiner* — Stephen M Gravini

(57) ABSTRACT

The present disclosure discloses a vacuum drying tank, including a shell and a pumping device. The shell includes a first shell part, a second shell part, and a third shell part; the second shell part has an accommodating cavity provided with an opening in the top; an air pumping hole is formed in the accommodating cavity; the first shell part is, hermetically covered at the opening; the third shell part is arranged below the second shell part; the pumping device is arranged in the third shell part and is communicated with the air pumping hole; and the pumping device is used for pumping out air in the accommodating cavity from the air pumping hole, so that the accommodating cavity is in a vacuum state.

20 Claims, 12 Drawing Sheets

(56) References Cited

U.S. PATENT DOCUMENTS

| | | | | |
|---|---|---|---|---|
| 2013/0164417 | A1* | 6/2013 | Wu | A23B 9/08 426/531 |
| 2023/0341183 | A1* | 10/2023 | Yu | F26B 9/003 |

FOREIGN PATENT DOCUMENTS

| | | | | |
|---|---|---|---|---|
| JP | 2009533130 | A * | 9/2009 | |
| WO | WO-2011013016 | A1 * | 2/2011 | A23B 4/03 |

* cited by examiner

VACUUM DRYING TANK

TECHNICAL FIELD

The present disclosure relates to the field of drying and storage equipment, particularly to a vacuum drying tank.

BACKGROUND

Skin care has become a part of people's daily life. Beauty and makeup include many things, such as hair extensions, eyelash grafting, etc., which all require adhesives. Many adhesives cannot be used in one time. In order to avoid invalidation or partial solidification, the remaining adhesive needs to be dried as soon as possible to facilitate the subsequent storage and prolong the service life of the adhesive. However, since there will be a certain amount of moisture in air, after a long period of storage, the adhesive will inevitably regain moisture, which will seriously affect the use of the adhesive and even damage the adhesive. Therefore, such items need to be stored in vacuum drying equipment after use.

In addition to application in the field of beauty, the above vacuum drying equipment is often used in daily life, such, as storing snacks that need to be stored in a dried state. At this time, food need to be dried before storage, but the vacuum drying devices on the market generally have the technical problems of "large volume, inconvenience in carrying, and low drying efficiency", so a small-volume drying device is urgently required to solve the above-mentioned technical problems.

SUMMARY

In order to overcome the disadvantage of the existing drying tank, the present disclosure provides a vacuum drying tank.

The present disclosure adopts the following technical solution: a vacuum drying tank, including a shell and a pumping device, wherein the shell includes a first shell part, a second shell part, and a third shell part; the second shell part has an accommodating cavity provided with an opening in the top; an air pumping hole is formed in the accommodating cavity; the first shell part is hermetically covered at the opening; the third shell part is arranged below the second shell part; the pumping device is arranged in the third shell part and is communicated with the air pumping hole; and the pumping device is used for pumping out air in the accommodating cavity from the air pumping hole, so that the accommodating cavity is in a vacuum state.

Further, when the first shell part is hermetically covered at the opening, the first shell, part and the accommodating cavity form a storage space larger than the accommodating cavity.

The vacuum drying tank further includes a button, wherein the button is transversely slidably arranged between the second shell part and the third shell part and slides between a first position and a second position; a bottom end surface of the accommodating cavity is provided with a through hole and a sealing member; the through hole penetrates through the bottom end surface of the accommodating cavity so as to communicate the storage space with external air, when the button is located at the first position, the sealing member is clung to the through hole to close the through hole; when the button is pressed to move to the second position, the button applies an extrusion force to the sealing member, so that the sealing member is extruded to deform to open the through hole.

Further, the sealing member includes a first large-diameter part, a second large-diameter part, and a small-diameter part; the small-diameter part is arranged between the first large-diameter part and the second large-diameter part; a diameter length of the first large-diameter part and a diameter length of the second large-diameter part are both greater than that of the small-diameter part; and the diameter length of the second large-diameter part is greater than that of the first large-diameter part.

Further, the bottom end surface of the accommodating cavity is further provided with a mounting opening; the mounting opening penetrates through the bottom end surface of the accommodating cavity; the mounting opening is matched with the small-diameter part; the small-diameter part is arranged in the mounting opening; the first large-diameter part is arranged above the bottom end surface of the accommodating cavity; and the second large-diameter part is arranged below the bottom end surface of the accommodating cavity so as to fix the sealing member on the bottom end surface of the accommodating cavity.

Further, the second large-diameter part is clung to the through hole to close the through hole.

The vacuum drying tank further includes a first elastic member, wherein one end of the first elastic member is connected to the shell, and the other end is pressed against, the second large-diameter part so as to apply an acting force that faces the through hole to the second large-diameter part.

Further, the first elastic member is a torsional spring; one end of the torsional spring is fixed to the shell, and the other end has a circling part; the circling part is of a spiral structure, an outer diameter of which gradually increases from bottom to top; and the top of the circling part is pressed against the second large-diameter part.

Further, the first elastic member is a clip; one end of the clip is fixed to the shell, and the other end of the clip has an arc convex surface; and the arc convex surface is pressed against the second large-diameter part.

The vacuum drying tank further includes a second elastic member, wherein the button includes a sliding part and a mounting part; the mounting part is fixed on the bottom end surface of the accommodating cavity; the mounting part is provided with a first sliding slot; the sliding part is slidably arranged in the first sliding slot; one end of the second elastic member is fixed to the mounting part, and the other end is fixed to the sliding part; when the button slides from the first position to the second position, the second elastic member changes from a natural non-stressed state to a stressed state; and at the time, the second elastic member applies a resilience acting force to the button to enable the button to move from the second position to the first position.

Further, the sliding part is provided with a second sliding slot; the mounting part is provided with a first positioning column; the first positioning column is located at a rear end in the second sliding slot; the sliding part is provided with a second positioning column; the second positioning column is located at a front end of the second sliding slot; the second elastic member is arranged in the second sliding slot; and one end of the second elastic member is fixed to the first positioning column, and the other end is fixed to the second positioning column.

Further, a front end of the sliding part is further provided with an extrusion sharp end; the extrusion sharp end is an inverted triangle with a narrow front part and a rear wide part; and when the button slides to the second position, the extrusion sharp end extrudes the second large-diameter part so as to open the through hole.

Further, an annular gap is provided at a joint of the first shell part and the second shell part; a guide slot is arranged in the annular gap; and the front end of the button is slidably arranged in the guide slot.

The vacuum drying tank further includes a sealing ring, wherein the sealing ring is arranged between the first shell part and the second shell part.

Further, a top surface of the sealing ring is provided with an annular sealing bulge; the first shell part is provided with an annular groove matched with the annular sealing bulge at the joint to the second shell part; and when the first shell part is buckled to the second shell part, the annular sealing bulge is embedded into the annular groove.

Further, the top of the second shell part is provided with a third positioning column; the third positioning column is provided with a first limiting part; a third limiting hole matched with the third positioning column is formed in the first shell part; a second limiting part is arranged in the third limiting hole; and when the first shell part is buckled to the second shell part, the third positioning column penetrates into the third limiting hole, and a lateral side of the first limiting part resists against a lateral side of the second limiting part so as to prevent the first shell part from transversely rotating relative to the second shell part.

The vacuum drying tank further includes an air guide pipe, wherein one end of the air guide pipe is communicated to the pumping device, and the other end is communicated to the pumping hole.

Further, the bottom of the third shell part is provided with a power slot; the power slot includes a conductive sheet; the conductive sheet is electrically connected to the pumping device; and the power slot is used for mounting a power supply.

Further, the shell is further provided with a power button and a display screen; the power button is used for turning on and turning off equipment; and the display screen is used for human-computer interaction.

The vacuum drying tank further includes a base, wherein the base is arranged below the third shell part; the top of the base is connected to the bottom of the second shell part; and the base is used for protecting the third shell part.

The present disclosure has the beneficial effects: During use of the equipment, the first shell can be opened. An object is stored in the accommodating cavity through the opening in the top of the second shell part. The first shell part is hermetically covered at the top of the second, shell part. The pumping device is turned on to generate a pumping force. Under the action of the pumping device, the air in the storage space is pumped out so as to form a vacuum state, thus bringing away water marks on a product and water vapor in the air to achieve a vacuum drying state. The structure is simple, and the design is ingenious.

In the present disclosure, a tank body can be set, according to a market requirement, to be smaller so as to facilitate carrying. Compared with drying equipment which has a large volume and a large drying space, the vacuum tank of the present, disclosure has higher drying efficiency due to the smaller storage space, is helpful to save energy, is more environmentally-friendly, and is easy to operate and convenient to use.

When the object needs to be taken out of the tank body of the vacuum tank after use, it is difficult to separate the first shell part from the second shell part due to a negative pressure state in the storage space. In order to solve this technical problem, the present disclosure is further provided with the button, and the through hole communicated to the outside is formed in the storage space. When the button is located at the first position, the through hole is closed by the sealing member to maintain the sealed state of the storage space. When the vacuum tank needs to be opened, only a transverse acting force is applied to the button to enable the button to move from the first position to the second position. At this time, the sealing member is extruded by the button to deform to open the through hole, so that the storage space is communicated to the external air, thus relieving the vacuum state in the storage space. Therefore, the technical problem that it is hard to open the first shell part when the storage space is in the vacuum stage is solved, and great convenience is brought to users.

BRIEF DESCRIPTION OF THE DRAWINGS

For the purpose of a clearer description of the embodiments in this application or technical solutions in prior art, below is a brief introduction of the attached drawings needed to be used in the description of the embodiments or prior art. Apparently, the attached drawings in the following description are only some embodiments indicated in the present application. For ordinary skill in the art, they may obtain other drawings according to these attached drawings without any innovative laboring.

The present disclosure will be further described with reference to the attached drawings and the embodiments hereunder.

DETAILED DESCRIPTION OF THE EMBODIMENTS

Figure 1:
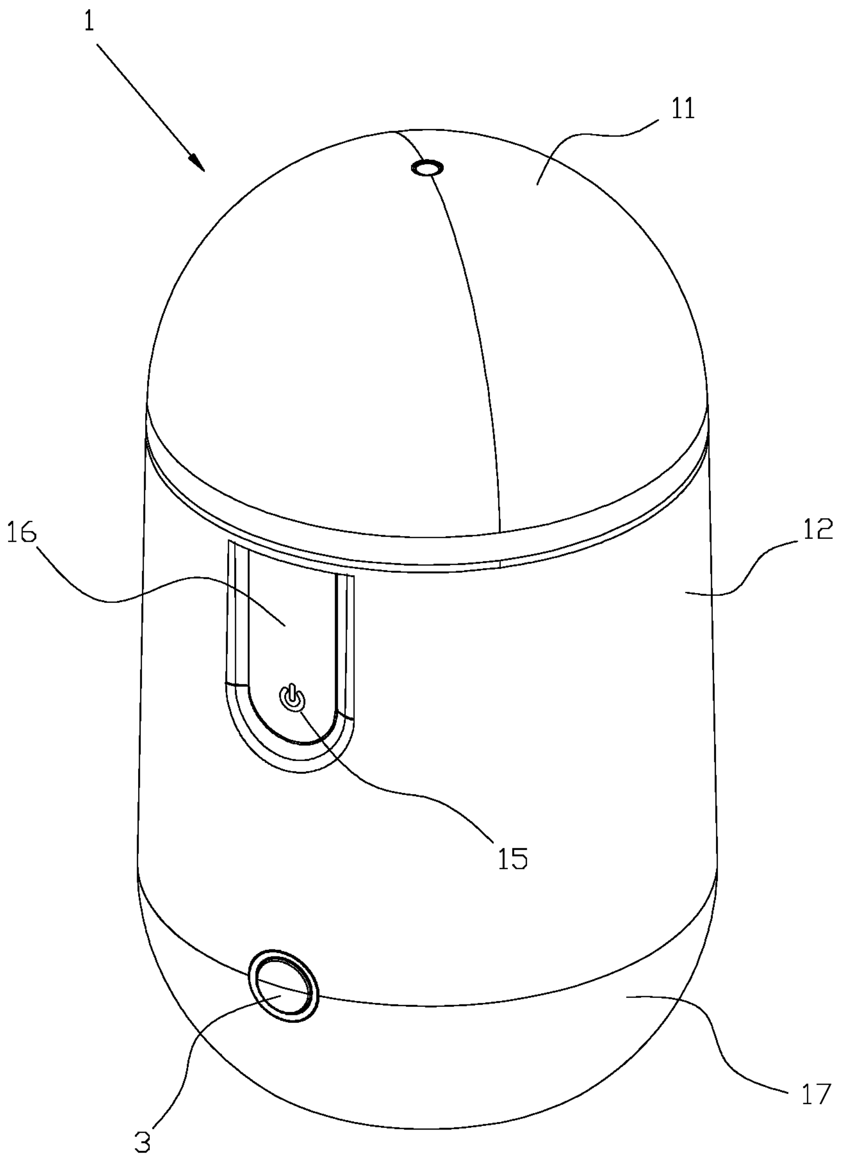
FIG. 1 illustrates a three-dimensional diagram of a vacuum tank.
Figure 2:
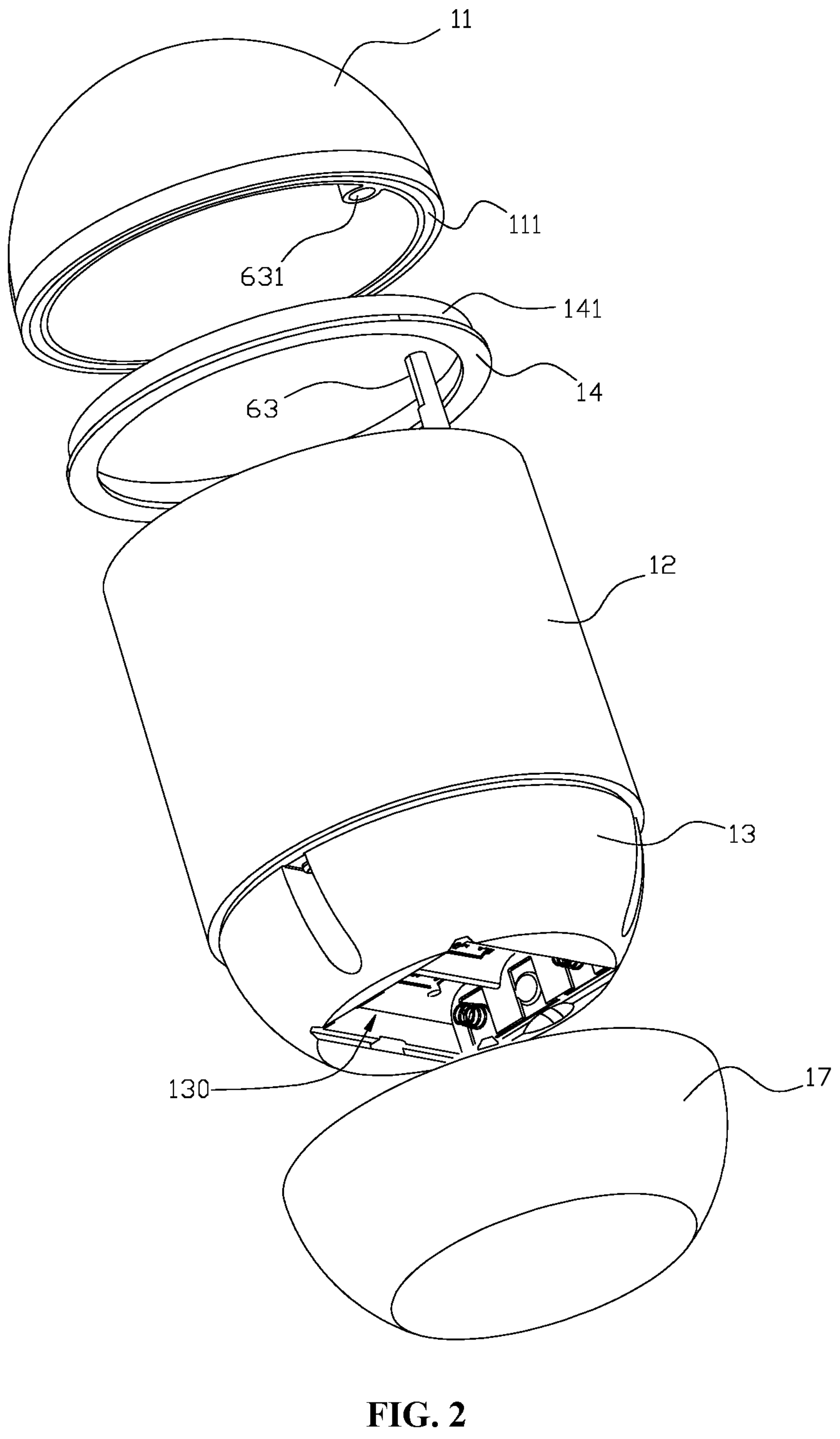
FIG. 2 illustrates an exploded diagram of a vacuum tank.
Figure 3:
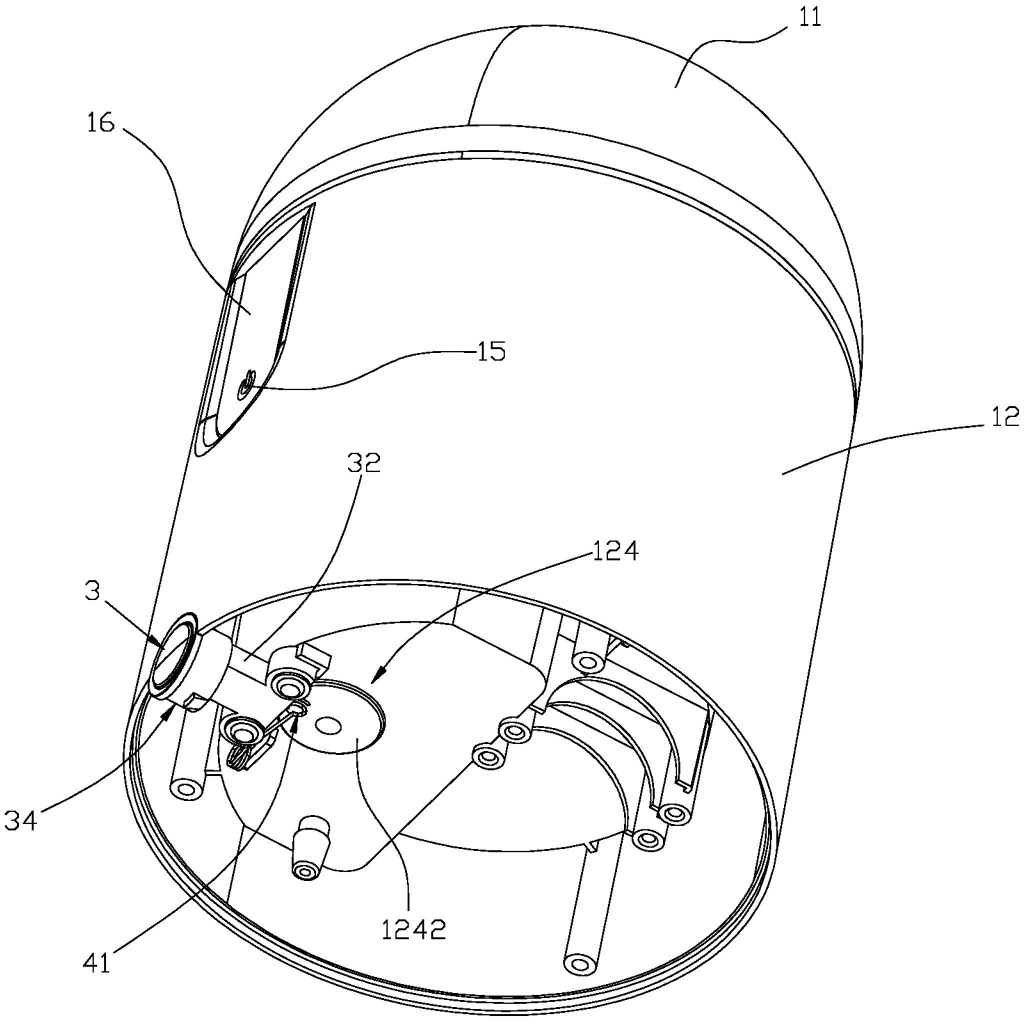
FIG. 3 illustrates a bottom view of a bottom of a second shell part.

In order to provide a clear understanding of the objects, features, and advantages of the embodiments, the following are detailed and complete descriptions to the technological solutions adopted in the embodiments. Obviously, the descriptions are part of the whole embodiments. The other embodiments which are not processed creatively by technicians of ordinary skills in the field are under the protection of this disclosure. The same is given with reference to the drawings and specific embodiments. It should be noted that non-conflicting embodiments in the disclosure and the features in the embodiments may be combined with each other without conflict.

In the following description, numerous specific details are set forth in order to provide a full understanding of the disclosure. The disclosure may be practiced otherwise than as described herein. The following specific embodiments are not to limit the scope of the disclosure.

Unless defined otherwise, all technical and scientific terms herein have the same meaning as used in the field of the art as generally understood. The terms used, in the disclosure are to describe particular embodiments and are not intended to limit the disclosure.

The disclosure, referencing the accompanying drawings, is illustrated by way of examples and not by way of limitation. It should be noted that references to "an" or "one" embodiment in this disclosure are not necessarily to the same embodiment, and such references mean "at least one."

As shown in FIG. 1 to FIG. 5, the present disclosure discloses a vacuum drying tank, including a shell 1 and a pumping device 2. The shell 1 includes a first shell, part 11, a second shell part 12, and a third shell part 13; the second shell part 12 is internally hollowed; the second shell part 12 has an opening in the top and is provided with a bottom end surface at the bottom; a hollow cavity inside the second shell part 12 and the bottom end surface form an accommodating cavity 120 used for storing an object; and an air pumping hole 121 is formed in the bottom end surface of the accommodating cavity 120. As a preference, the first shell part 11 is hemispherical and has a certain space inside. When the first shell part 11 is hermetically buckled to the second shell part 12, the internal space of the first shell part 11 and the accommodating cavity 120 form a larger storage space 122 so as to further enlarge a storage space for the object. The third shell part 13 is arranged below the second shell part 12. The pumping device 2 is arranged in the third shell part 13 and is communicated with the air pumping hole 121. The pumping device 2 is used for pumping out air in the storage space 122 through the air pumping hole 121, so that the storage space 122 is in a vacuum state. Specifically, in this embodiment, the vacuum drying tank is further provided with an air guide pipe 21. One end of the air guide pipe 21 is communicated to the pumping device 2, and the other end is communicated to the air pumping hole 121.

During use of the equipment, the first shell part 11 is first opened. An object is stored in the accommodating cavity 120 through the opening in the top of the second shell part 12. The first shell part 11 is covered at the top of the second shell part 12. The first shell part 11 and the second shell part 12 can be fastened through a thread, a fastener, or in a nested manner so as to ensure sealing. After the above steps are completed, the pumping device 2 is turned on to generate a pumping force. Under the action of the pumping device 2, the air in the storage space 122 is pumped out via the air pumping hole 121 and the air guide pipe 21 so as to form a vacuum state, thus bringing away water marks on a product and water vapor in the air to achieve a vacuum drying state. Therefore, by means of the above structural setting, in the present disclosure, a tank body can be set, according to a market requirement, to be smaller so as to facilitate carrying. Compared with drying equipment which has a large volume and a large drying space, the vacuum tank of the present disclosure has higher drying efficiency due to the smaller storage space 122, is helpful to save energy, is more environmentally-friendly, and is easy to operate and convenient to use.

Figure 4:
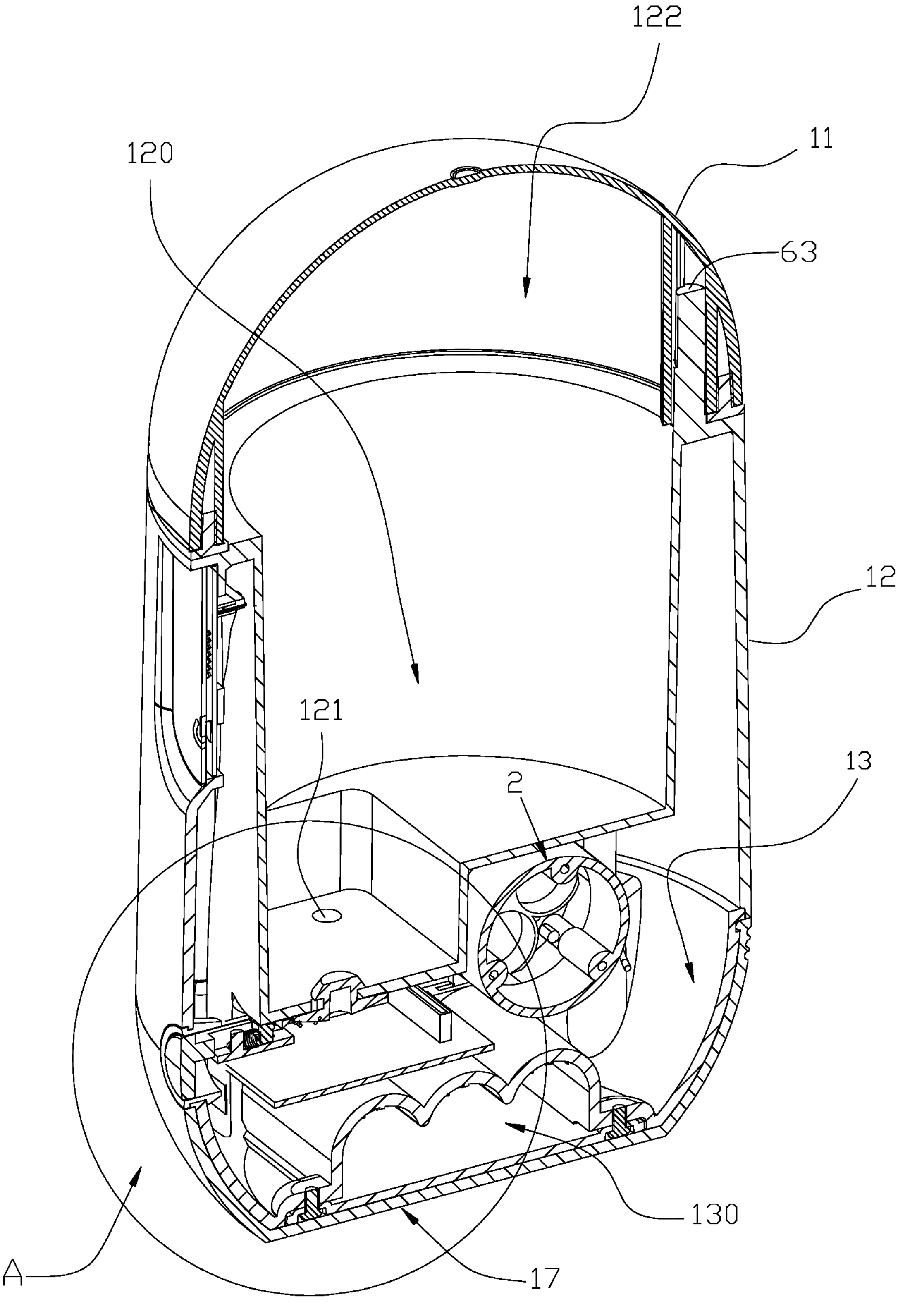
FIG. 4 illustrates a sectional view of a vacuum tank in a three-dimensional state.
Figure 5:
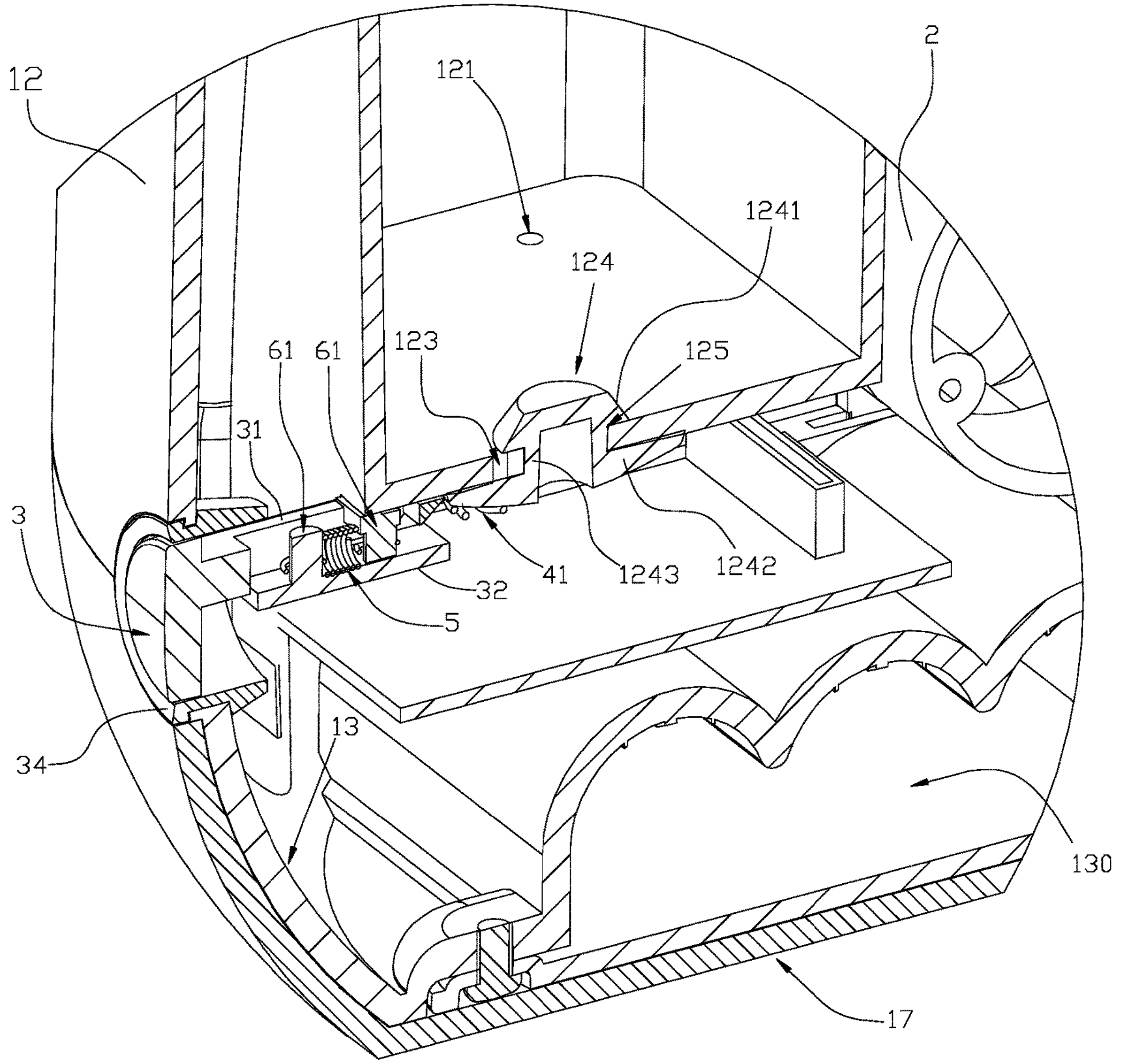
FIG. 5 is a partially enlarged diagram of Part A.
Figure 6:
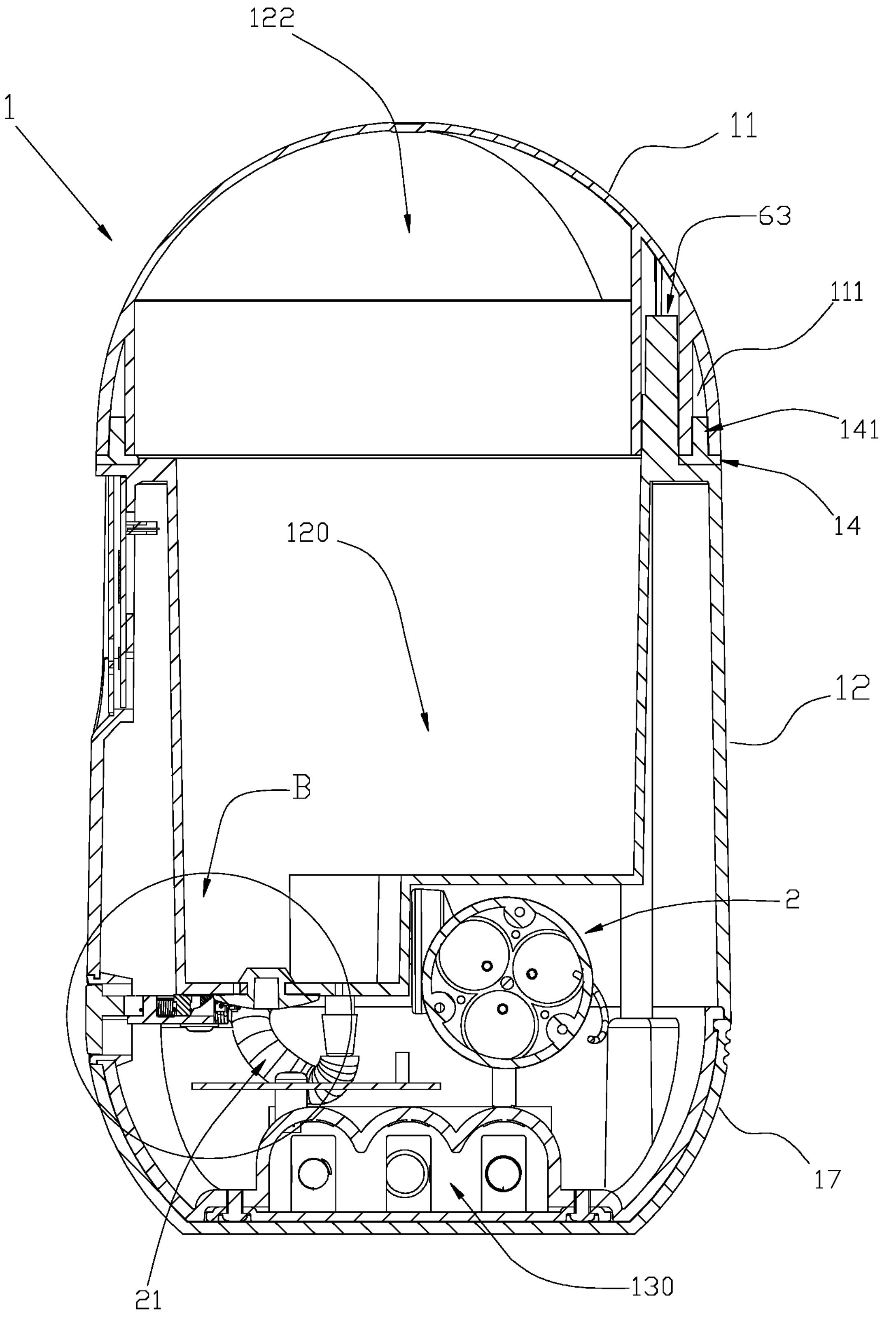
FIG. 6 illustrates a sectional view from a side surface of a vacuum tank.
Figure 7:
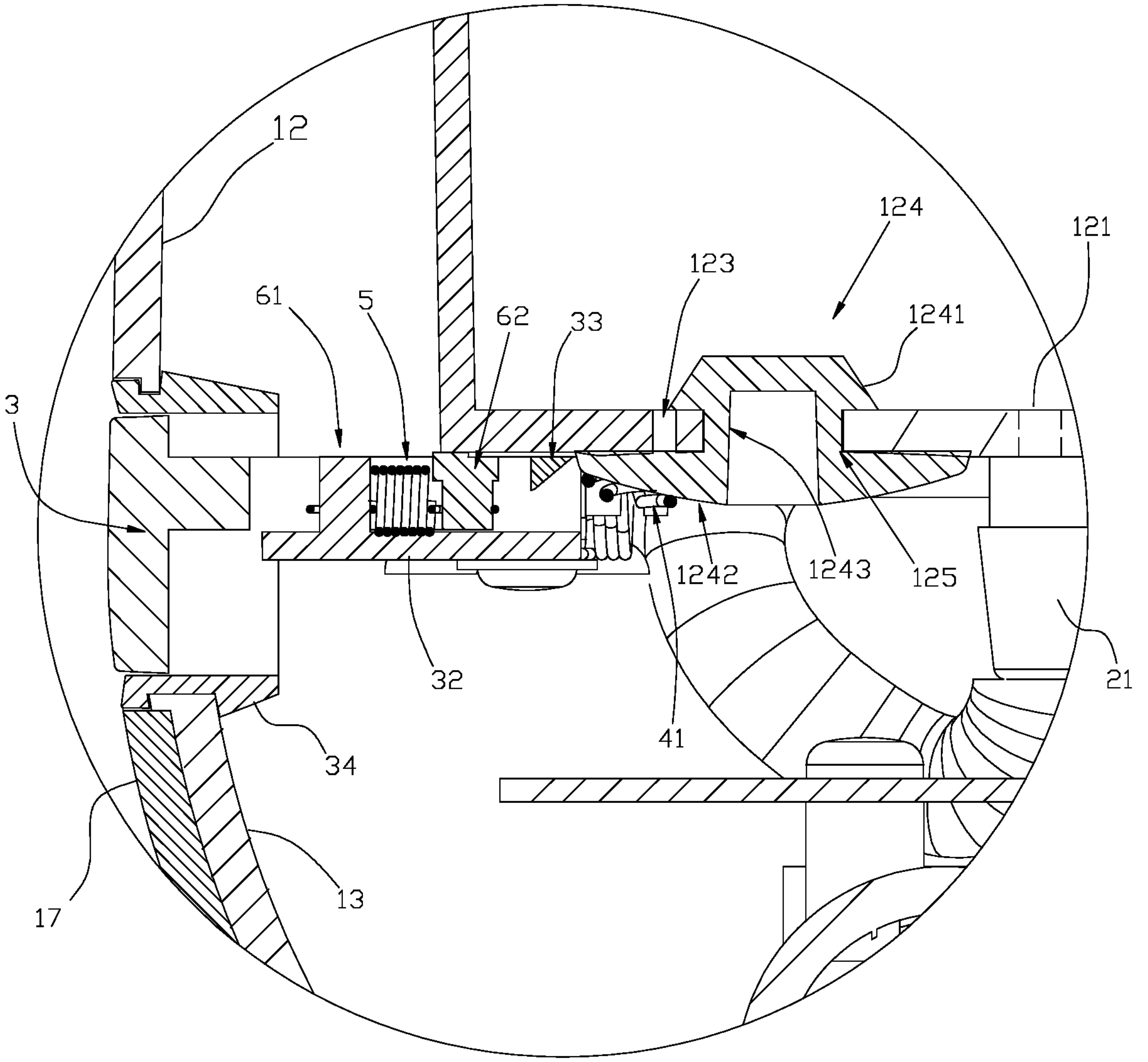
FIG. 7 illustrates a partially enlarged diagram of Part B, where a button is located at a first position, and a second large-diameter part is clung to a through hole.
Figure 8:
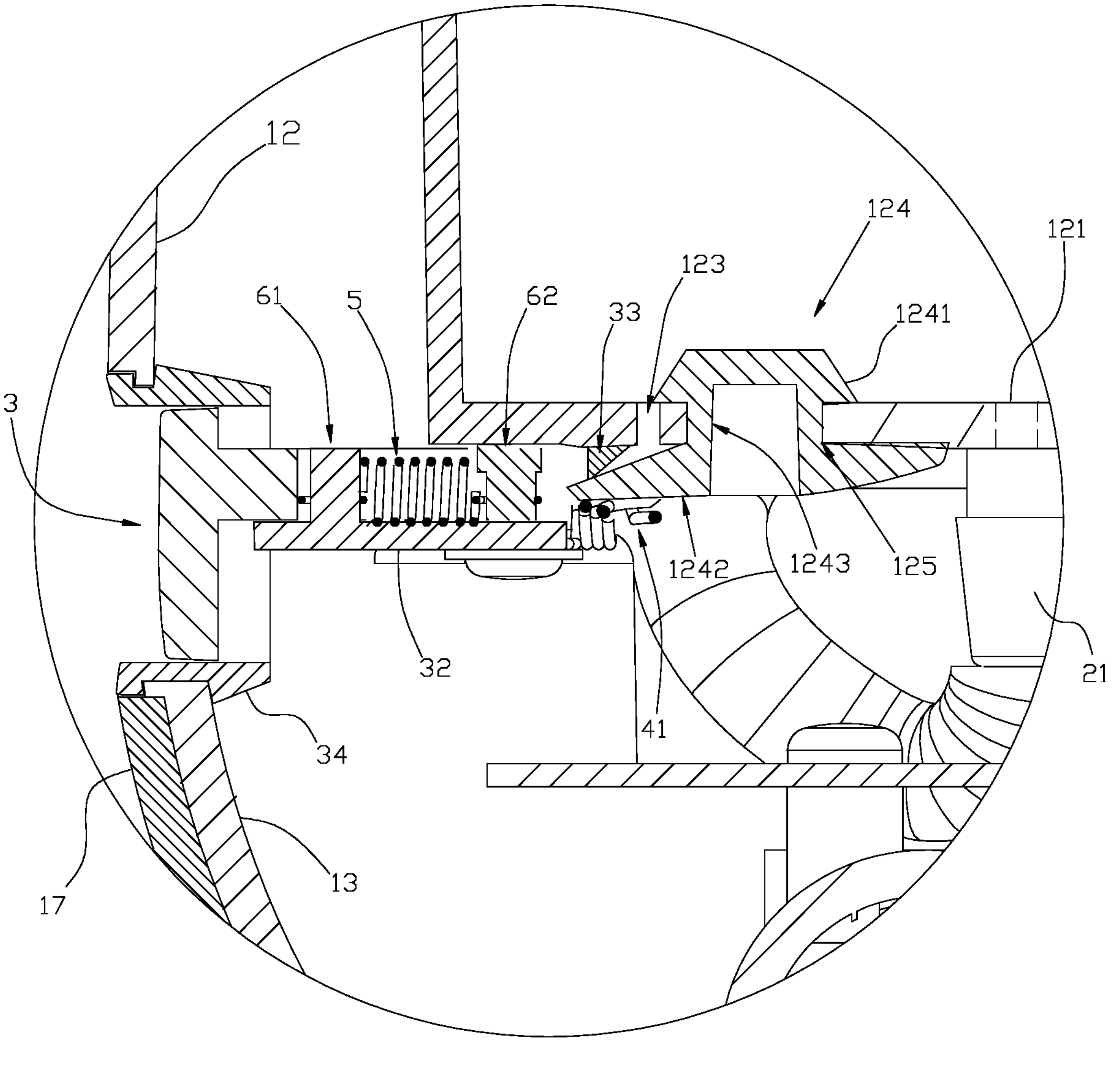
FIG. 8 illustrates a schematic diagram where the button in FIG. 7 is located at a second position, and the through hole is opened through the second large-diameter part.
Figure 9:
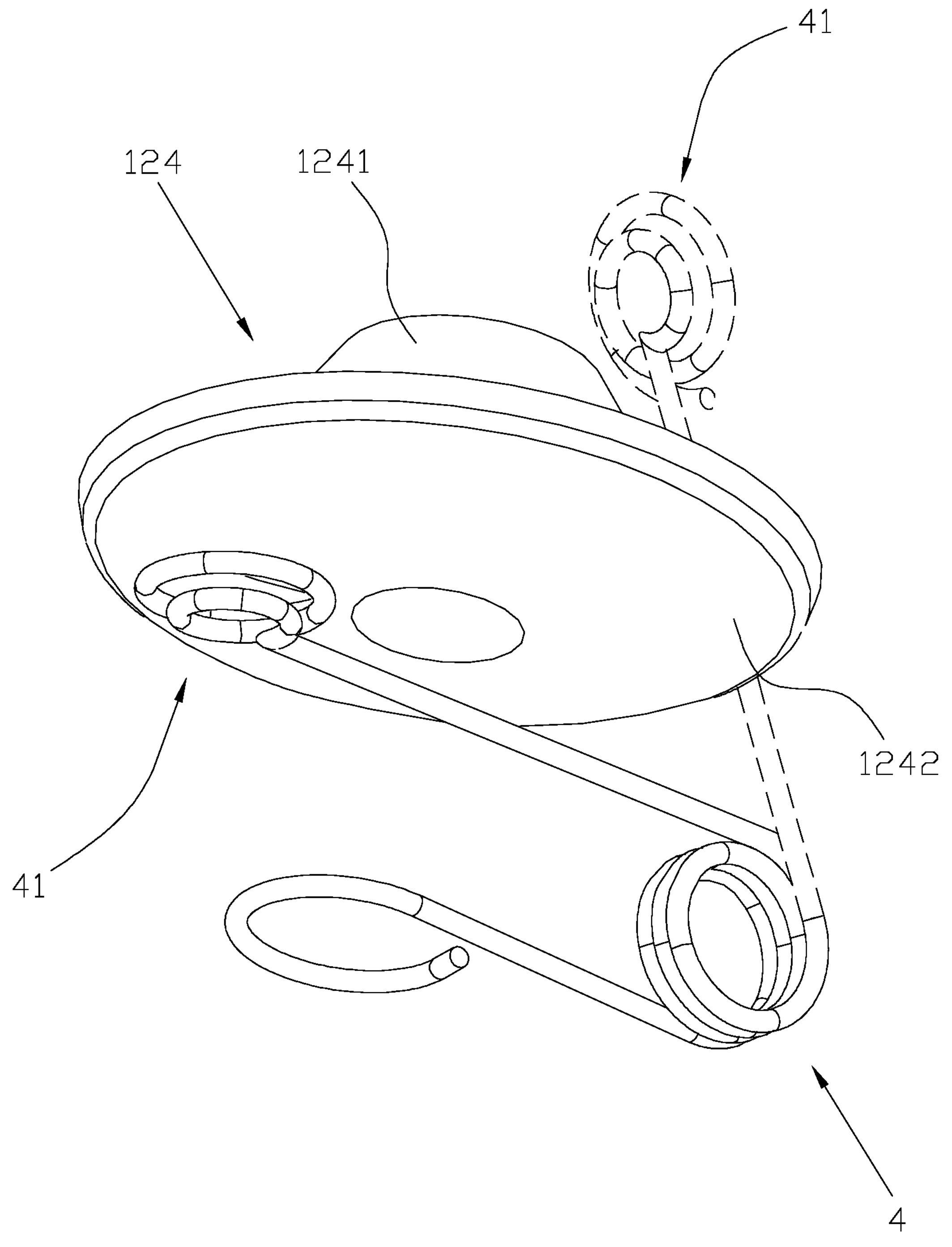
FIG. 9 illustrates a schematic diagram of a mounting relation between a sealing member and a first elastic member (the dotted line in the figure indicates a position where a "circling part" is in a natural state)
Figure 10:
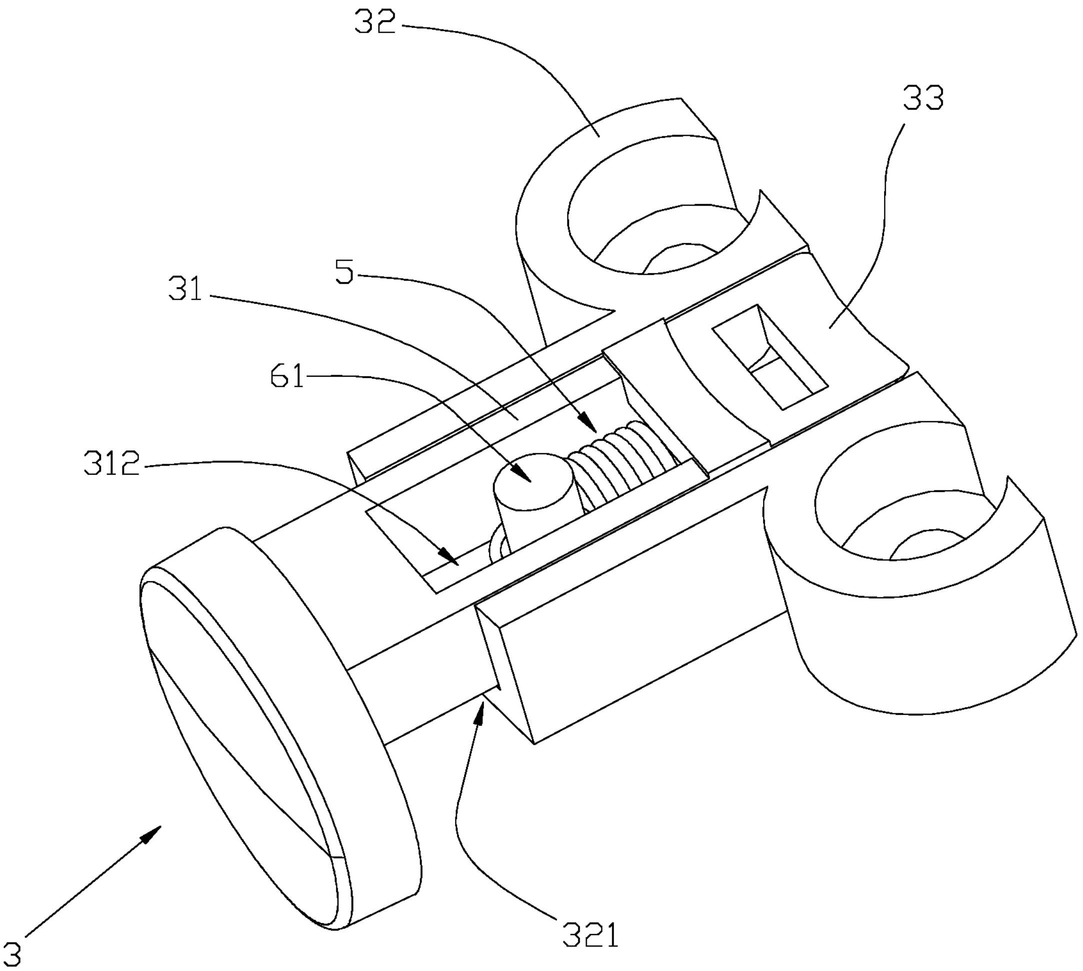
FIG. 10 illustrates a schematic diagram of an assembling, relation of the button.
Figure 11:
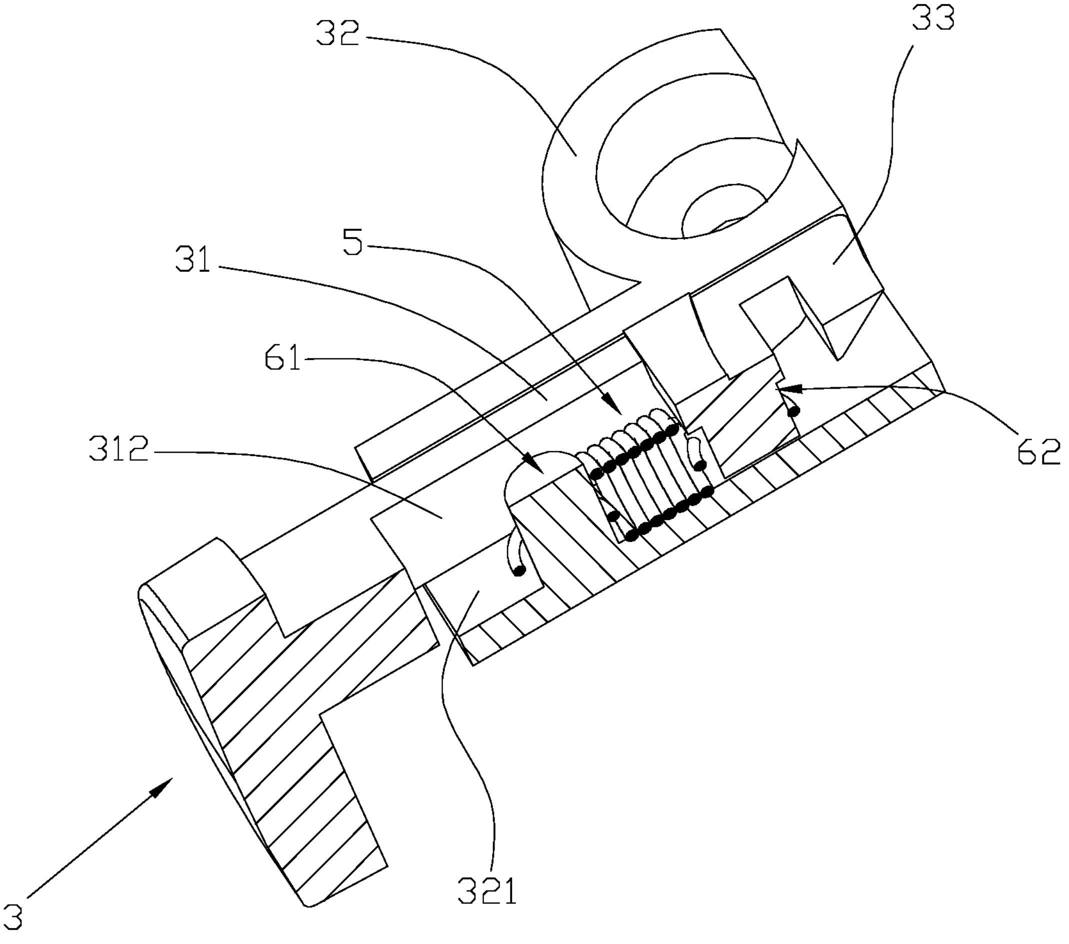
FIG. 11 illustrates a schematic sectional diagram of FIG. 10 (where the button is located at the first position)
Figure 12:
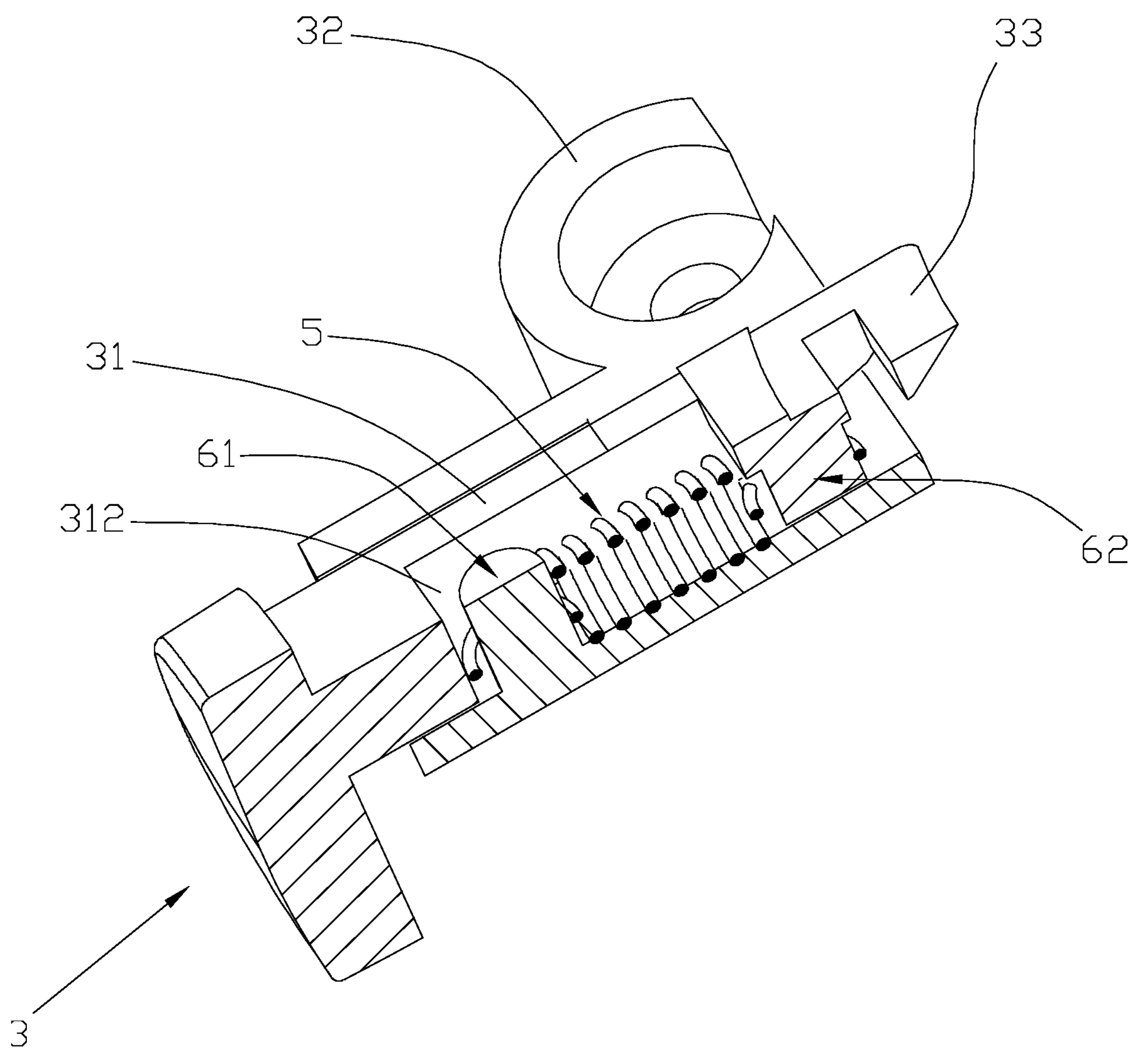
FIG. 12 illustrates a schematic diagram where the button of FIG. 11 is located at the second position.

When the object needs to be taken out of the tank body of the vacuum tank after use, it is difficult to separate the first shell part 11 from the second shell part 12 due to a negative pressure state in the storage space 122. In order to solve this technical problem, as shown in FIG. 4 and FIG. 5 the present disclosure further includes a button 3. The button 3 is transversely slidably arranged between the second shell part 12 and the third-shell part 13 and slides between a first position and a second position. The bottom end surface of the accommodating cavity 120 is provided with a through hole 123 and a sealing member 124; and the through hole 123 penetrates through the bottom end surface of the accommodating cavity 120 so as to communicate the storage space 122 with external air. Specifically, the through hole 123 is communicated to the outside through a gap at a joint of the second shell part 12 and the third shell part 13.

When the button 3 is located at the first position, the sealing member 124 is clung to the through hole 123 to close the through hole 123; when the button 3 is pressed to move to the second position, the button 3 applies a transverse force to the sealing member 124, so that the sealing member 124 is extruded by the button 3 to deform to open the through hole 123, so as to communicate the storage space 122 to the external air.

By the above structural setting, when an object is stored in the vacuum tank, the button 3 is located at the first position. At this time, the through hole 123 is closed by the sealing member 124 so as to maintain a sealed state of the storage space 122. When the vacuum tank needs to be opened, only a transverse acting force is applied to the button 3 to enable the button to move from the first position to the second position. At this time, the sealing member 124 is extruded by the button 3 to deform to open the through hole 123, so that the storage space 122 is communicated to the external air, thus relieving the vacuum state in the storage space 122.

As shown in FIG. 5 to FIG. 12, the sealing member 124 includes a first large-diameter part 1241, a second large-diameter part 1242, and a small-diameter part 1243; the small-diameter part 1243 is arranged between the first large-diameter part 1241 and the second large-diameter part 1242; a diameter length of the first large-diameter part 1241 and a diameter length of the second large-diameter part 1242 are both greater than that of the small-diameter part 1243; and the diameter length of the second large-diameter part 1242 is greater than that of the first large-diameter part 1241.

The bottom end surface of the accommodating cavity 120 is further provided with a mounting opening 125. The mounting opening 125 penetrates through the bottom end surface of the accommodating cavity 120. The sealing member 124 is snapped in the mounting opening 125.

The mounting opening 125 is matched with the small-diameter part 1243. The through hole 123 is disposed near the mounting opening 125. The small-diameter part 1243 is arranged in the mounting opening 125. The first large-diameter part 1241 is arranged above the bottom end surface of the accommodating cavity 120. The first large-diameter part 1241 does not shield the through hole 123. The second large-diameter part 1242 is arranged below the bottom end surface of the accommodating cavity 120 so as to fix the sealing member 124 on the bottom, end surface of the accommodating cavity 120. The second large-diameter part 1242 is clung to the bottom of the bottom end surface of the accommodating cavity 120, thus shielding the through hole 123 to close the through hole 123.

In order to ensure that the second large-diameter part 1242 is clung to the through hole 123, the present disclosure further includes a first elastic member 4. One end of the first elastic member 4 is connected to the shell 1, and the other end is pressed against the second large-diameter part 1242 to apply an acting force that faces the through hole 123 to the second large-diameter part 1242 so as to enable the second, large-diameter part 1242 to be clung to the through hole 123.

The first elastic member 4 of the present disclosure is a torsional spring; one end of the torsional spring is fixed below the bottom end surface of the accommodating cavity 120, and the other end has a circling part 41; the circling part 41 is of a spiral structure, an outer diameter of which gradually increases from bottom to top; and the top of the circling part 41 is pressed against the second large-diameter part 1242.

By the above structure, the circling part 41 always applies an acting force that faces the bottom end surface of the accommodating, cavity 120 to the second large-diameter part 1242 to further ensure that the second large-diameter part 1242 is clung to the through hole 123. In addition, the circling part 41 is of the spiral structure, the outer diameter of which gradually increases from bottom to top, so that the outer diameter of its top end is the largest. The top end resists against the second large-diameter part 1242, which enlarges a contact area between the circling part 41 and the second large-diameter part 1242, thus further enhancing the closing effect.

In this embodiment, the first elastic member 4 may also be other elastic member having the above function. For example, the first elastic member 4 may also be a clip. One end of the clip is fixed to the shell 1, and the other end of the clip has an arc convex surface. The arc convex surface is pressed against the second large-diameter part 1242.

After the vacuum state of the storage space 122 is relieved, the button 3 is required to be reset from the second position back to the first position so as to recover the leakproofness of the storage space 122 for next use. Therefore, an acting force for resilience is required to be applied to the button 3.

In order to solve the above technical problems, as shown in FIG. 7, FIG. 8, FIG. 10, FIG. 11, and FIG. 12, the vacuum drying tank of the present disclosure further includes a second elastic member 5. The button 3 includes a sliding part 31 and a mounting part 32. The mounting part 32 is fixed on the bottom end surface of the accommodating cavity 120. The mounting part 32 is provided with a first sliding slot 321; the sliding part 31 is slidably arranged in the first sliding slot 321; one end of the second elastic member 5 is fixed to the mounting part 32, and the other end is fixed to the sliding part 31; when the button 3 slides from the first position to the second, position, the second elastic member 5 changes from a natural non-stressed state to a stressed state; and at the time, the second elastic member 5 applies an acting force to the button 3 to enable the button to move from the second position to the first position.

The sliding part 31 is provided with a second sliding slot 312; the mounting part 32 is provided with a first positioning column 61; the first positioning column 61 is located at a rear end in the second sliding slot 312; the sliding part 31 is provided with a second positioning column 62; the second positioning column 62 is located at a front end of the second sliding slot 312; the second elastic member 5 is arranged in the second sliding slot 312; and one end of the second elastic member 5 is fixed to the first positioning column 61, and the other end is fixed to the second positioning column 62. A front end of the sliding part 31 is further provided with an extrusion sharp end 33; the extrusion sharp end 33 is an inverted triangle with a narrow front part and a rear wide part; and when the button 3 is located at the second position, the extrusion sharp end 33 extrudes the second large-diameter part 1242 so as to open the through hole 123.

By the above structural setting, when the button 3 is located at the first position, the second elastic member 5 is fixed between the first positioning column 61 and the second positioning column 62, and at this time, the second elastic member 5 is in the natural non-stressed state; and when the button 3 is slightly pushed with a finger to move to the second position under a force, the sliding part 31 slides in the first sliding slot 321, so as to drive the second positioning column 62 to be away from the first positioning column 61, thus driving the second elastic member 5 to extend. At this time, the extrusion sharp end 33 extrudes the second large-diameter part 1242 to open the through hole 123. After the finger leaves the button, the extended second elastic member 5 rebounds, thus driving the sliding part 31 to return to the first position.

Preferably, an annular gap is provided at a joint of the first shell part 11 and the second shell part 12; a guide slot 34 is arranged in the annular gap; and the front end of the button 3 is slidably arranged in the guide slot 34.

Preferably, the vacuum drying tank of the present disclosure further includes a sealing ring 14. The sealing ring 14 is arranged between the first shell part 11 and the second shell part 12. Specifically, a top surface of the sealing ring 14 is provided with an annular sealing bulge 141; and the first shell part 11 is provided with an annular groove 111 matched with the annular sealing bulge 141 at the joint to the second shell part 12.

By the above structural setting, when the first shell part 11 is buckled to the second shell part 12, the annular sealing bulge 141 is embedded into the annular groove 111, so as to further ensure the leakproofness of the storage space. In addition, embedding of the annular sealing bulge 141 and the annular groove 111 makes the connection between the first shell part and the second shell part, firmer.

Preferably, the top of the second shell part 12 is provided with a third positioning column 63; the third positioning column 63 is provided with a first limiting part; a third limiting hole 631 matched with the third positioning column 63 is formed in the first shell part 11; a second limiting part is arranged in the third limiting hole 631; and when the first shell part 11 is buckled to the second shell part 12, the third positioning column 63 penetrates into the third limiting hole 631, and a lateral side of the first limiting part resists against a lateral side of the second limiting part so as to prevent the first shell part 11 from transversely rotating relative to the second shell part 12.

A side surface of the third positioning column 63 is provided with a sunken part that is sunken inwardly; a side surface in the third limiting hole 631 is provided with a protruding part that protrudes outwardly. When the third positioning column 63 penetrates into the third limiting hole 631, the sunken part and the protruding part are embedded to and resist against each other so as to prevent the first shell part 11 from transversely rotating relative to the second shell part 12.

The bottom of the third shell part 13 is provided with a power slot 130; the power slot 130 includes a conductive sheet; the conductive sheet is electrically connected to the pumping device 2; and the power slot 130 is used for mounting a power supply. The shell 1 is further provided with a power button 15 and a display screen 16. Specifically, the power button 15 and the display screen 16 are both arranged on the second shell part 12. The power button 15 is used for turning on and turning off equipment; and the display screen 16 is used for human-computer interaction.

The vacuum tank of the present disclosure further includes a base 17. The base 17 is arranged below the third shell part 13; the top of the base 17 is connected to the bottom of the second shell part 12; and the base 17 is used for protecting the third shell part 13.

Finally, it should be noted that above embodiments are merely used for illustrating the technical solutions of the disclosure, rather than limiting the disclosure; though the disclosure is illustrated in detail with reference to the aforementioned embodiments, it should be understood by those of ordinary skill in the art that modifications may still be made on the technical solutions disclosed in the aforementioned respective embodiments, or equivalent substitutions may be made to a part of technical features thereof; and these modifications or substitutions do not make the essence of the corresponding technical solutions depart from the spirit and scope of the technical solutions of the respective embodiments of the disclosure.

The invention claimed is:

1. A vacuum drying tank, comprising a shell and a pumping device, wherein the shell comprises a first shell part, a second shell part, and a third shell part; the second shell part has an accommodating cavity and is provided with an opening in a top of second shell part; an air pumping hole is formed in the accommodating cavity; the first shell part is hermetically covered at the opening; the third shell part is arranged below the second shell part; the pumping device is arranged in the third shell part and is communicated with the air pumping hole; and the pumping device is used for pumping out air in the accommodating cavity from the air pumping hole, so that the accommodating cavity is in a vacuum state.

2. The vacuum drying tank according to claim 1, wherein when the first shell part is hermetically covered at the opening, the first shell part and the accommodating cavity form a storage space larger than the accommodating cavity.

3. The vacuum drying tank according to claim 2, further comprising a button, wherein the button is transversely slidably arranged between the second shell part and the third shell part and slides between a first position and a second position; a bottom end surface of the accommodating cavity is provided with a through hole and a sealing member; the through hole penetrates through the bottom end surface of the accommodating cavity so as to communicate the storage space with external air; when the button is located at the first position, the sealing member is clung to the through hole to close the through hole; when the button is pressed to move to the second position, the button applies an extrusion force to the sealing member, so that the sealing member is extruded to deform to open the through hole.

4. The vacuum drying tank according to claim 3, wherein the sealing member comprises a first large-diameter part, a second large-diameter part, and a small-diameter part; the small-diameter part is arranged between the first large-diameter part and the second large-diameter part; a diameter length of the first large-diameter part and a diameter length of the second large-diameter part are both greater than that of the small-diameter part; and the diameter length of the second large-diameter part is greater than that of the first large-diameter part.

5. The vacuum drying tank according to claim 4, wherein the bottom end surface of the accommodating cavity is further provided with a mounting opening; the mounting opening penetrates through the bottom end surface of the accommodating cavity; the mounting opening is matched with the small-diameter part; the small-diameter part is arranged in the mounting opening; the first large-diameter part is arranged above the bottom end surface of the accommodating cavity; and the second large-diameter part is arranged below the bottom end surface of the accommodating cavity so as to fix the sealing member on the bottom end surface of the accommodating cavity.

6. The vacuum drying tank according to claim 5, wherein the second large-diameter part is clung to the through hole to close the through hole.

7. The vacuum drying tank according to claim 6, further comprising a first elastic member, wherein one end of the first elastic member is connected to the shell, and the other end is pressed against the second large-diameter part so as to apply an acting force that faces the through hole to the second large-diameter part.

8. The vacuum drying tank according to claim 7, wherein the first elastic member is a torsional spring; one end of the torsional spring is fixed to the shell, and the other end has a circling part; the circling part is of a spiral structure, an outer diameter of which gradually increases from bottom to top; and a top of the circling part is pressed against the second large-diameter part.

9. The vacuum drying tank according to claim 7, wherein the first elastic member is a clip; a first end of the clip is fixed to the shell, and a second end of the clip has an arc convex surface; and the arc convex surface is pressed against the second large-diameter part.

10. The vacuum drying tank according to claim 4, further comprising a second elastic member, wherein the button comprises a sliding part and a mounting part; the mounting part is fixed on the bottom end surface of the accommodating cavity; the mounting part is provided with a first sliding slot; the sliding part is slidably arranged in the first sliding slot; a first end of the second elastic member is fixed to the mounting part, and a second end of the second elastic member is fixed to the sliding part; when the button slides from the first position to the second position, the second elastic member changes from a natural non-stressed state to a stressed state; and at the time, the second elastic member applies a resilience acting force to the button to enable the button to move from the second position to the first position.

11. The vacuum drying tank according to claim 10, wherein the sliding part is provided with a second sliding slot; the mounting part is provided with a first positioning column; the first positioning column is located at a rear end in the second sliding slot; the sliding part is provided with a second positioning column; the second positioning column is located at a front end of the second sliding slot; the second elastic member is arranged in the second sliding slot; and a first end of the second elastic member is fixed to the first positioning column, and a second end of the second elastic member is fixed to the second positioning column.

12. The vacuum drying tank according to claim 11, wherein a front end of the sliding part is further provided with an extrusion sharp end; the extrusion sharp end is an inverted triangle with a narrow front part and a rear wide part; and when the button slides to the second position, the extrusion sharp end extrudes the second large-diameter part so as to open the through hole.

13. The vacuum drying tank according to claim 12, wherein an annular gap is provided at a joint of the first shell part and the second shell part; a guide slot is arranged in the annular gap; and the front end of the button is slidably arranged in the guide slot.

14. The vacuum drying tank according to any one of claim 13, further comprising a sealing ring, wherein the sealing ring is arranged between the first shell part and the second shell part.

15. The vacuum drying tank according to claim 14, wherein a top surface of the sealing ring is provided with an annular sealing bulge; the first shell part is provided with an annular groove matched with the annular sealing bulge at the joint to the second shell part; and when the first shell part is buckled to the second shell part, the annular sealing bulge is embedded into the annular groove.

16. The vacuum drying tank according to claim 15, wherein the top of the second shell part is provided with a third positioning column; the third positioning column is provided with a first limiting part; a third limiting hole matched with the third positioning column is formed in the first shell part; a second limiting part is arranged in the third limiting hole; and when the first shell part is buckled to the second shell part, the third positioning column penetrates into the third limiting hole, and a lateral side of the first limiting part resists against a lateral side of the second limiting part so as to prevent the first shell part from transversely rotating relative to the second shell part.

17. The vacuum drying tank according to claim 16, further comprising an air guide pipe, wherein a first end of the air guide pipe is communicated to the pumping device, and a second end of the air guide pipe is communicated to the pumping hole.

18. The vacuum drying tank according to claim 17, wherein a bottom of the third shell part is provided with a power slot; the power slot comprises a conductive sheet; the conductive sheet is electrically connected to the pumping device; and the power slot is used for mounting a power supply.

19. The vacuum drying tank according to claim 18, wherein the shell is further provided with a power button and a display screen; the power button is used for turning on and turning off equipment; and the display screen is used for human-computer interaction.

20. The vacuum drying tank according to claim 19, further comprising a base, wherein the base is arranged below the third shell part; the top of the base is connected to the bottom of the second shell part; and the base is used for protecting the third shell part.

* * * * *